Patented Nov. 7, 1939

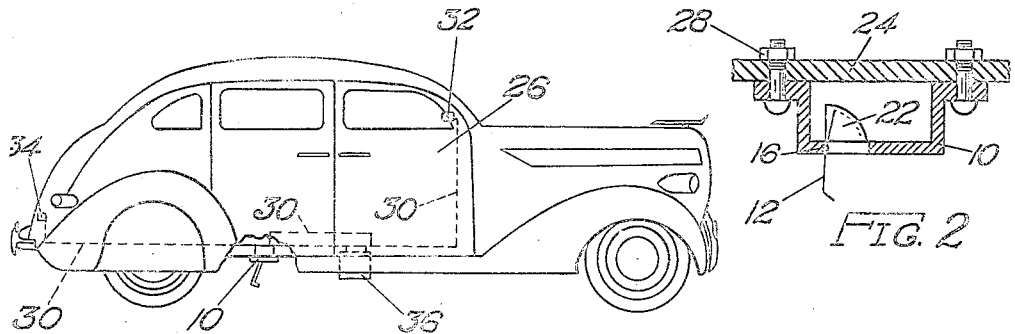
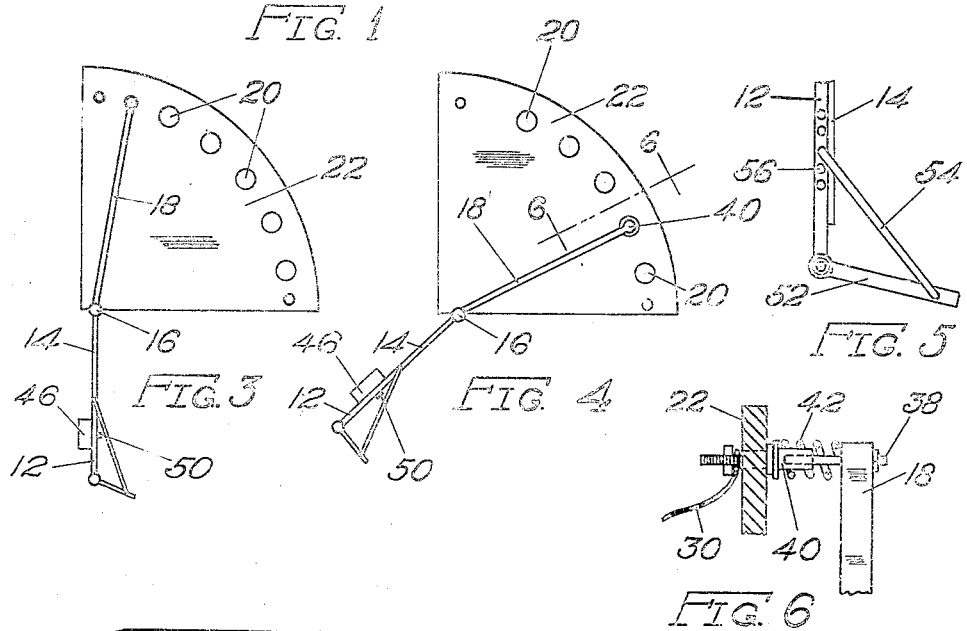
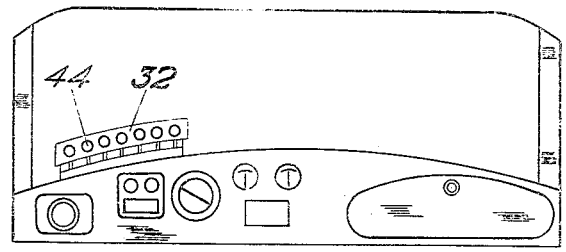
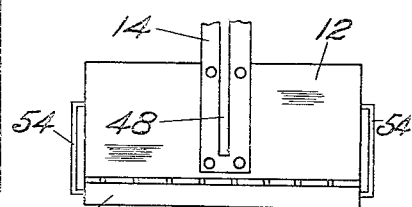
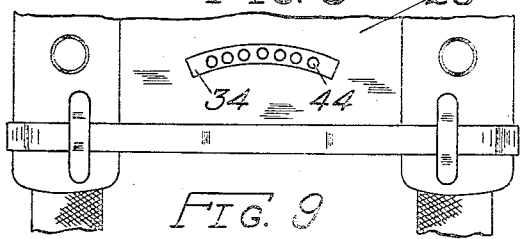
VALENTINE RUMCHAKS
INVENTOR

2,179,103

UNITED STATES PATENT OFFICE 2,179,103

SPEED INDICATOR

Valentine Rumchaks, Chicago, Ill.

Application July 14, 1937, Serial No. 153,621

1 Claim. (Cl. 200—81)

This invention relates to an improved speed indicator, and has, for one of its principal objects, the provision of means which can be applied to a vehicle, particularly an automobile, and which will indicate both to the driver or operator thereof and also to others, the speed at which the automobile is traveling.

One of the important objects of this invention is to provide, in conjunction with an automobile or the like, a speed indicating means which will be variable upon motion of the car and which is controlled mainly by the wind resistance set up by the car when in motion.

Another object of the invention is to provide a simple, yet effective, wind speed indicator for automobiles or the like, which, when used in conjunction with a series of indicating lights, will immediately and visually, and, at the same time, accurately indicate the speed which the automobile or other vehicle is traveling.

Another and still further important object of the invention is the provision, in an automobile speed indicator, of means for adjusting the wind vane or similar appurtenance whereby allowance may be made for the position of the vane, its dimensions, and even for head or tail winds.

Other and further important objects of the invention will be apparent from the disclosures in the accompanying drawing and following specification.

The invention, in a preferred form, is shown in the drawing and hereinafter more fully described.

In the drawing:

Figure 1 is a side elevation of an automobile, showing the improved speed indicator of this invention applied thereto.

Figure 2 is a slightly enlarged view of the speed indicator itself, illustrating generally the operation of same and also illustrating the casing or housing, and the method of attaching same to the assembly.

Figure 3 is a detail view of the vane of the indicator, together with an attached arm which travels over a series of binding posts or contact points whereby a series of signal light are illuminated as the speed progresses.

Figure 4 is another view of the device of Figure 3, showing the same in a different position and also indicating the use of a counterweight and other elements by means of which the operation may be adjusted.

Figure 5 is a detail view, illustrating one adjustable feature of the invention.

Figure 6 is a view, partly in section, taken on the line 6—6 of Figure 4, looking in the direction indicated by the arrows.

Figure 7 is a front view of the device shown in Figure 5, showing some of the adjustable features.

Figure 8 is an elevation of an automobile windshield, showing the improved indicator of this invention aplied thereto.

Figure 9 is a view of a portion of the rear of an automobile, showing another feature of the invention.

As shown in the drawing:

The reference numeral 10 indicates generally the housing or casing on which the improved speed indicator of this invention is mounted, the indicator itself comprising generally a vane 12 of metal or the like supported by an arm or plate 14 (Figure 7), which arm is pivoted at 16 in the housing 10 and has an extension 18 which rides over a series of contact points or binding posts 20 mounted in an arcuate plate 22 of some suitable insulating material.

The housing 10 is removably attached to the under-face of the floor board 24 of the automobile 26 by means of bolts or the like 28, and wires 30 lead from the binding post 20 to banks of indicator lights 32 and 34 which are mounted respectively in the windshield and at the rear of the car, these wires being also connected to the battery 36.

In the end of the arm 18 is mounted a rod 38 upon which is slidably fitted a contact element 40 normally impelled into outermost position by means of the helical spring 42, and this contact element 40 is adapted to ride over the contact points 20 in succession as the car gathers speed. Each of the contact points 20 is, of course, connected to one of the current-carrying wires 30, and these, in turn, lead to individual light globes 44 mounted in the indicator banks 32 and 34 on the windshield and at the rear of the car respectively. As will be evident from an inspection of Figures 3 and 4, the device is inoperative when the car is at rest, and even when running at speeds of say less than thirty miles per hour, the first contact being preferably made at a speed of approximately thirty miles per hour. From then on, the contacts are preferably graduated at intervals representing increases of speed of around five miles per hour, but obviously these can be graduated differently so as to vary the indicated results over practically any desired range, while, at the same time, the apparatus uses no current when the car is at rest.

This varying or adjustability of the indicated results can be accomplished in more than one manner, the first being by the adjustment of a counterweight 46 in a positioning slot 48 which is formed in the supporting element 14 and also in the corresponding portion of the vane 12 as best shown in Figure 7. Adjustment of this weight by means of its supporting bolt or nut 50 enables a proper compensation for variations in wind speed.

Another similar adjustment is accomplished by providing a hinged flap or extension 52 at the lower edge of the vane 12, this being supported by means of side brackets 54, the lower ends of the brackets being pivotally mounted in the extension 52, and the upper ends being capable of adjustably fitting into any one of a series of openings 56 as best illustrated in Figure 5.

If desired, this adjustment can be made while the car is actually in motion by providing a simple hand hole in the floor board 24 of the automobile. This hand hole can obviously be covered when not in use.

It will be obvious that by the use of this device, the operator of any car will be immediately acquainted with the speed at which it is traveling, the contact points 20 being individually connected to lights of various colors, which colors may be made standard for speed indicators of this type. For example, a speed of thirty miles per hour may be indicated by a white light, forty miles per hour by a green light, fifty by an amber light, sixty by a red light or in any other convenient manner. The banks of such lights are so arranged in the windshield that besides being immediately visible to the operator, they are also visible to other observers such as persons in oncoming cars or bystanders.

The bank of lights at the rear is, of course, similarly arranged so that the speed of the car is immediately apparent to anyone following or behind the same. Accordingly, a person driving in a zone rated at forty miles per hour will so govern his speed as to keep his indicating light within that range, and if his speed does exceed the predetermined limit, his indicating lights will immediately announce the fact both to the operator and also to all observers. In this manner, careless and dangerous drivers will automatically announce their attitude to the world at large and to traffic policemen in particular, and many serious accidents will undoubtedly be averted.

Either bank of lights, but particularly those on the windshield, can be attached in many ways; for example, a set of vacuum cups may be used, this allowing ready application of the device to any automobile while in service, and, at the same time, allowing of a very easy shifting of the lights themselves from place to place as desired.

The banks of lights may also include a signal light known as the stop light and also other indicating lights such as backing lights and possibly, in addition, some official indicator. For example, a light of a certain color may indicate an official car such as a police car. All these, of course, may be in one bank of lights and operated in particular and special manners, as, for example, by the speed indicator vane itself or by switches on the brake pedal as is common with stop light construction or by a hand switch which, of course, may be used to operate official indicating lights.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A speed indicator for automobiles, a housing, a wind vane outside of the housing and pivotally mounted in one face of the housing, an arm extending from the vane into the housing and in a fixed relationship with the vane, a spring-pressed contact point at the end of the arm, an arcuate plate inside the housing, and a series of contact points in the plate over which the end of the arm travels, together with means for adjusting the air resistance capacity of the vane, said means comprising a hinged flap at the outer edge of the vane, and means for changing the angular relationship of the flap with the vane, said means comprising an arm attached to the outer end of the flap and being adjustably positioned in slots in the vane, together with auxiliary means for adjusting the effective indicating operation of the vane, said means comprising a counter-weight slidably mounted in a slot in the rear of the vane.

VALENTINE RUMCHAKS.